United States Patent [19]

Jasinski et al.

[11] Patent Number: 5,120,471
[45] Date of Patent: Jun. 9, 1992

[54] PROCESS AND COMPOSITION FOR PROTECTING CHROME STEEL

[75] Inventors: Raymond J. Jasinski; Wayne W. Frenier, both of Tulsa, Okla.

[73] Assignee: Dowell Schlumberger Incorporated, Tulsa, Okla.

[21] Appl. No.: 561,032

[22] Filed: Aug. 1, 1990

Related U.S. Application Data

[63] Continuation-in-part of Ser. No. 474,232, Jan. 30, 1990, Pat. No. 5,013,483, Ser. No. 13,603, Feb. 12, 1987, abandoned, and Ser. No. 765,890, Aug. 14, 1985, abandoned.

[51] Int. Cl.$^5$ .................. C23F 11/12; C23F 11/14; C23F 11/18
[52] U.S. Cl. .................. 252/389.54; 252/392; 252/396; 252/8.555; 252/390; 422/14; 422/16
[58] Field of Search ............ 252/389.54, 390, 392, 252/396, 8.555; 422/14, 16

[56] References Cited

U.S. PATENT DOCUMENTS

| | | | |
|---|---|---|---|
| H751 | 3/1990 | Sullivan et al. | 252/396 |
| 1,915,148 | 6/1933 | Berliner et al. | 252/389.54 |
| 2,431,715 | 12/1947 | Wachter | 252/387 X |
| 2,814,593 | 11/1957 | Beiswanger et al. | 252/8.553 |
| 2,869,978 | 1/1959 | Fischer | 252/389.54 |
| 3,773,465 | 11/1973 | Keeney et al. | 252/389.53 |
| 4,220,550 | 9/1980 | Frenier et al. | 252/180 |
| 4,310,435 | 1/1982 | Frenier | 252/8.555 |
| 4,493,775 | 1/1985 | Coffey et al. | 252/8.553 |
| 4,498,997 | 2/1985 | Walker | 252/8.553 |
| 4,499,003 | 2/1985 | Foroulis | 252/192 |
| 4,552,658 | 6/1985 | Walker | 210/169 |
| 4,552,672 | 11/1985 | Walker | 252/8.553 |
| 4,725,373 | 2/1988 | Treybig et al. | 252/8.555 |
| 4,734,259 | 3/1988 | Frenier et al. | 252/396 X |
| 4,740,320 | 4/1988 | Treybig et al. | 252/8.555 |
| 4,956,076 | 9/1990 | Awbrey | 252/396 X |
| 5,002,673 | 3/1991 | Williams et al. | 252/8.555 |
| 5,013,483 | 5/1991 | Frenier et al. | 252/396 |

OTHER PUBLICATIONS

Raymond Jasinski et al., "Inhibiting HCl Corrosion of High Chrome Tubular Steels" presented at *Corrosion 88*, pp. 188/1 to 188/13 (Mar. 21–25, 1988).

*Primary Examiner*—Deborah L. Kyle
*Assistant Examiner*—Valerie Fee
*Attorney, Agent, or Firm*—Stephen A. Littlefield

[57] ABSTRACT

A composition and method for inhibiting the corrosion of steel containing greater than about 9% chromium in the presence of at least one mineral acid, especially at temperatures above 250° F. The composition is made of a corrosion inhibitor selected from phenyl ketone, phenyl ketone with a quaternary salt of a nitrogen-containing heterocyclic aromatic compound, or cinnamaldehyde with a quaternary salt of a nitrogen-containing heterocyclic aromatic compound and an acid soluble metal from antimonium or bismuth.

12 Claims, No Drawings

PROCESS AND COMPOSITION FOR PROTECTING CHROME STEEL

CROSS REFERENCE TO RELATED APPLICATION

This application is a continuation-in-part of application Ser. No. 07/474,232, filed Jan. 30, 1990, now U.S. Pat. No. 5,013,483, application Ser. No. 07/013,603, filed Feb. 12, 1987, now abandoned, and application Ser. No. 06/765,890, filed Aug. 14, 1985, now abandoned.

FIELD OF THE INVENTION

The present invention relates to a new and useful class of corrosion inhibitors, and a process of using them. More particularly, the present invention concerns novel compositions which reduce the attack of aqueous acid solutions on steel, especially steel containing greater than about 9% chromium, and a process of using them.

TECHNOLOGY REVIEW

In the exploration and recovery of oil from underground fields, it is common to "acidize" both new and producing wells with aqueous solutions of strong acids. As reserves of easily produced hydrocarbons become exhausted, oil and gas companies have been forced to develop deep, hot reservoirs that contain significant quantities of $CO_2$ and $H_2S$. Alloys that contain high concentrations of chromium and nickel have been developed that are much more resistant to the corrosive effects of these acid gases than are carbon alloy tubing steels. Acidizing treatment performed through these high chrome steels, however, present significant problems since the corrosive attack of HCl and HF on these metals is much more difficult to inhibit than is the corrosive attack by these acids on carbon steels. Increasingly, "duplex" chrome steels are being employed in wells that contain high concentrations of $H_2S$, because they are much more resistant to hydrogen-induced stress corrosion cracking (HSCC) than are the 13% chromium and nickel and low alloy steels. These metals are called "duplex" because they contain approximately 50/50 percent of ferrite and austenite iron phases. Unfortunately, duplex steels are active metals in hydrochloric acid since there is not enough chromium and nickel to stabilize the passive, protective oxide coatings common to "chrome steels".

Various inhibitors for preventing the attack of acids on high chromium content steels have been proposed. Of the many inhibitors especially designed to prevent acid attack on well casings, very few provide satisfactory protection, especially above about 275° F.

U.S. Pat. No. 3,773,465 discloses acid corrosion inhibitors selected from cuprous iodide, acetylenic compounds or nitrogen compounds. Example VIII compares the efficacy of various compounds of iodine and copper, including $BiI_3$ and $Bi(IO_3)_3$, each mixed with 2% Halliburton Blend-57 acid corrosion inhibitor. The comparison indicates that cuprous iodide forms an effective inhibited treating acid when added to a treating acid together with acetylenic and nitrogen acid corrosion inhibitors.

U.S. Pat. No. 4,493,775 to Coffey et al. discloses a composition for inhibiting corrosion of ferrous metals exposed to acid environments and to $H_2S$. The composition is made of 1) a cyclohexylamine or derivatives, salts, or mixtures thereof, 2) per mole of (1), greater than 10 moles of formaldehyde or an amount of paraformaldehyde sufficient to release that amount of formaldehyde, 3) from 3 moles of (1) to an equimolar amount of (2) of acetophenone, derivatives or mixtures thereof, and 4) 0 to 10 wt %, based on the combined weights of (1) to (3), of a $C_1$ to $C_{20}$ aliphatic carboxylic acid and at least one acetylenic alcohol plus unreacted formaldehyde.

U.S. Pat. No. 4,498,997 to Walker discloses an acidic solution for acidizing subterranean formations having ferrous metal well bores. The composition is made of an acidic solution, especially of mineral acids, and a corrosion inhibitor made of one or more acetylenic alcohols, a quaternary ammonium compound, an aromatic hydrocarbon having high oil-wetting characteristics, and an antimony (Sb) compound.

U.S. Pat. No. 4,552,672 to Walker discloses another acidizing solution for treating subterranean formations which reduces its corrosive effect on ferrous and other metals. The acidizing solution is made of at least one mineral acid and an inhibitor. The inhibitor is made of acetylenic alcohols, quaternary ammonium compounds, an aromatic hydrocarbon having high oil-wetting characteristics, an antimony compound and a stabilizer. The stabilizer can be one of a reactive fluoride-containing compound, compounds having $\alpha$- or $\beta$-hydroxy organic acid functional groups or non-organic acid polyhydroxy compounds.

U.S. Pat. No. 4,734,259 to Frenier et al. discloses a corrosion inhibiting composition for use with ferrous metals such as iron and steel and nonferrous metals such as aluminum, zinc and copper. The composition is made of $\alpha,\beta$-unsaturated aldehydes and a surfactant. The surfactants may be anionic, cationic, non-ionic, or amphoteric.

There remains a need to provide an improved composition for inhibiting stainless steel corrosion caused by mineral acids, and especially at elevated temperatures.

SUMMARY OF THE INVENTION

The invention provides a composition and method for inhibiting the corrosion of stainless steel in the presence of at least one mineral acid, especially at temperatures above 250° F. The composition comprises an organic inhibitor from the group of phenyl ketone, phenyl ketone with a quaternary salt of a nitrogen-containing heterocyclic aromatic compound, and cynnamaldehyde with a quaternary salt of a nitrogen-containing heterocyclic aromatic compound and an acid-soluble compound from the group consisting of antimony and bismuth (Bi).

In a preferred embodiment, the novel composition further comprises formic acid or a formic acid derivative such as formamide or formic ester, when the acid soluble metal is an antimony salt.

In another preferred embodiment, when the acid soluble metal is $Bi_2O_3$, the novel composition further includes KI.

It is an object of the invention to provide an improved composition for inhibiting stainless steel corrosion caused by mineral acids, and especially by hydrochloric acid alone or in combination with hydrofluoric acid.

It is another object of the invention to provide an improved method for inhibiting stainless steel corrosion caused by such mineral acids.

It is an advantage of the invention that the improved composition is surprisingly effective in inhibiting the corrosion of stainless steel at elevated temperatures, especially a temperature range from above 250° F. to 475° F.

DETAILED DESCRIPTION OF THE PREFERRED EMBODIMENTS

Various phenyl ketones may be used in the corrosion-inhibiting composition of the present invention. The phenyl ketones may be $C_{9\text{-}20}$ $\alpha$-alkenylphenones or hydroxyalkenylphenones and mixtures thereof. Examples of phenyl ketones include:

(i) 2-benzoyl-3-hydroxy-1-propene

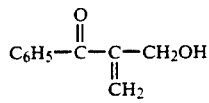

(ii) 2-benzoyl-3-methoxy-1-propene

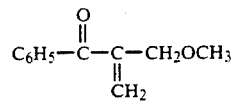

(iii) phenyl vinyl ketone

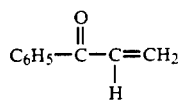

Precursors of alkenylphenones may take a variety of forms. Examples include:

(i) 5-benzoyl-1,3-dioxane

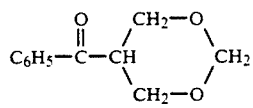

(ii) 2-benzoyl-1-1,3-dimethoxy-phopane

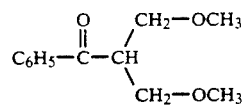

In 15% HCl at 65° C., (i) and (II) form 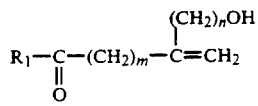,

The corrosion inhibitors of the present invention may contain more than one precursor of an phenyl ketone. For example, the corrosion inhibitors of the persent invention may include a mixture of precursors including an alpha-hydroxy vinylidene compound and a hydroxy ketone, preferably together with a surfactant. The alpha-hydroxy vinylidene compound has the form $$R_1-\underset{\underset{O}{\|}}{C}-(CH_2)_m-\underset{\underset{(CH_2)_nOH}{|}}{C}=CH_2$$

where $R_1$ may be an aryl hydrocarbon or inertly substituted aryl hydrocarbon; m and n must each be less than 5, and the total number of carbons in the compound should be 16 or less. A preferred example of an alpha-hydroxy vinylidene compound is 2-benzoyl-3-hydroxy-1-propene.

The hydroxy ketone has the form

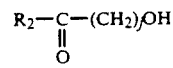

where $R_2$ may be an aryl hydrocarbon or inertly substituted aryl hydrocarbon. The value of j must be less than 5, and the compound should contain not more than 16 carbon atoms. A preferred example of a hydroxy ketone is 3-hydroxy-1-phenyl-1-propanone.

The nitrogen-containing heterocyclic aromatic quaternary salt may be one of a pyridinium, quinolinium, isoquinolinium, benzoazolinium or benzothiazolinium salts. Specific nitrogen-containing heterocyclic aromatic quaternary salts may be:
N-cyclohexylpyridinium bromide
N-octylpyridinium bromide,
N-nonylpyridinium bromide,
N-decylpyridinium bromide,
N-dodecylpyridinium bromide,
N,N-dodecyldipyridinium dibromide,
N-tetradecylpyridinium bromide,
N-laurylpyridinium chloride,
N-dodecylbenzylpyridinium chloride,
N-dodecylquinolinium bromide quinolinium-(1-naphthylenemethyl)chloride,
N-naphthylmethyl quinolinium chloride
Preferred nitrogen-containing heterocyclic aromatic quaternary salts are naphthylmethyl quinolinium chloride and dodecylpyridinium bromide.

The cynnamaldehyde used in the present invention may be substituted or unsubstituted. Examples of substituted cynnamaldehydes useful in the invention are:
dicinnamaldehyde,
p-hydroxycinnamaldehyde,
p-methylcinnamaldehyde,
p-ethylcinnamaldehyde,
p-methoxycinnamaldehyde,
p-dimethylaminocinnamaldehyde,
p-diethylaminocinnamaldehyde,
p-nitrocinnamaldehyde,
o-nitrocinnamaldehyde,
o-allyloxycinnamaldehyde,
4-(3-propenal)cinnamaldehyde,
p-sodium sulfocinnamaldehyde,
p-trimethylammoniumcinnamaldehyde sulfate,
p-trimethylammoniumcinnamaldehyde o-methylsulfate,
p-thiocyanocinnamaldehyde,
p-(S-acetyl)thiocinnamaldehyde,
p-(S-N,N-dimethylcarbamoylthio)cinnamaldehyde,
p-chlorocinnamaldehyde,
$\alpha$-methylcinnamaldehyde,
$\beta$-methylcinnamaldehyde,
$\alpha$-chlorocinnamaldehyde,
$\alpha$-bromocinnamaldehyde,
$\alpha$-butylcinnamaldehyde,
$\alpha$-amylcinnamaldehyde,
$\alpha$-hexylcinnamaldehyde,
$\alpha$-bromo-p-cyanocinnamaldehyde,
$\alpha$-ethyl-p-methylcinnamaldehyde,
p-methyl-$\alpha$-pentylcinnamaldehyde, By "acid soluble compound of antimony or bismuth" any compound yielding antimony or bismuth anions under acidic conditions is included. Any acid-soluble antimony salt may be used in the present invention. Preferred antimony salts are $Sb_2O_3$ and $SbCl_3$. Any acid-soluble bismuth compound may be used in the present invention. Examples of soluble bismuth compounds are $BiCl_3$, $BiI_3$, $Bi_2O_3$, and $BiOI$. $Bi_2O_3$ is preferred. Any source of acid-soluble iodide anion may be used in the present invention. Use of KI is preferred.

Formic acid and derivatives of formic acid may advantageously be used in the present invention. The formic acid derivatives may be formamides or formate esters. Formic acid is preferred in the invention.

Additionally surfactants and/or solvents may advantageously be used in the present invention. One function of these additives is to keep all the components of the present invention in solution at the temperatures, pressures, lengths of time and pH typical in a subterranean treatment of a formation containing petrochemicals.

The relative amounts of the above constituents follows. All percentages given are weight per cents compared to the volume of the acid used in acidizing the formation. From 0.1 to 2% of an organic inhibitor from the group of phenyl ketone, phenyl ketone plus nitrogen-containing heterocyclic aromatic quaternary salts and cynnamaldehyde with a nitrogen-containing, heterocyclic, aromatic quaternary salt can be used with 0.1 to 2% $Bi_2O_3$ and 0.1 to 2% KI. Alternatively, 0.1 to 2% of this organic inhibitor can be used with 0.01 to $Sb_2O_3$ or $SbCl_3$ and 0.5 to 10% formic acid.

EXAMPLES

In order that those skilled in this technology may better practice the invention, applicants now present illustrations of the present invention, without in any way limiting the scope of the invention.

Corrosion tests were conducted in a high pressure autoclave that held 20 4 oz. bottles and was filled with mineral oil to provide hydraulic pressure. One cleaned, 2 from a glass hook in weighed steel coupon (25 cm$^2$) was hung the bottle that was filled with 100 mL of HCl solution and sample test inhibitors. The bottle was topped with mineral oil.

At the end of testing, the coupons were removed, cleaned in acetone and reweighed. All corrosion rates are expressed as lb/sq.ft. of weight loss for the time period of the test. Duplex steel containing 22-25% Cr and 5% Ni and 13-Cr coupons containing 13% Cr as the major alloying element were tested. After the autoclave was closed, it was pressurized to about 5000 psig and heated to test temperature, and held at that temperature for 6 hours. The bottles were agitated during the test with a "washing machine" action. After the test, the coupons were removed, cleaned and reweighed as above.

The following formulations were tested as corrosion inhibitors:

FA85 85% formic acid.

AFAAF A reaction product of acetophenone, formaldehyde, and an amine; post formulated with acetylenic alcohols, nonionic surfactants and formaldehyde. It is described by U.S. Pat. No. 4,493,775.

AFAA A reaction product of acetophenone, formaldehyde, and an amine; post formulated with acetylenic alcohols, and nonionic surfactants.

QPK A mixture of quinolinium salts, phenyl ketones and nonionic surfactants.

PK A mixture of α-alkenylphenones.
NMQCl Naphthylmethylquinolinium chloride.
NMBZC Naphthylmethylbenzothiazolium chloride.
TCA Trans-cinnamaldehyde. Mixtures of TCA with surfactants are described by U.S. Pat. No. 4,734,259.
Octynol 1-octyn-3-ol.
DDPB dodecylpyridinium bromide.

EXAMPLE 1

These tests were run at 300° F. in 15% HCl with duplex steel SM25Cr containing 25% Cr and 5% Ni.

TABLE 1

| SM25Cr Tests at 300° F. for 6 Hours in 15% HCl | | | | |
|---|---|---|---|---|
| Sample | Inhibitor 2% Vol | 1st Additive g $Sb_2O_3$ | 2d Additive | Removal Rate lb/sq. ft. |
| 1 | — | 0.4 | — | 0.83 |
| 2 | Octynol | 0.4 | — | 0.75 |
| 3 | AFAAF | 0.04 | — | 0.16 |
| 4 | AFAAF | 0.04 | 2% FA85 | 0.051 |
| 5 | QPK | 0.04 | — | 0.031 |
| 6 | QPK | 0.4 | — | 0.014 |

Antimony provided protection to the duplex steel in the presence of either the reaction product of acetophenone, formaldehyde and an amine post-formulated with acetylenic alcohol, non-ionic surfactants and formaldehyde (AFAAF) or a mixture of quinolinium salts, phenyl ketone, and nonionic surfactants (QPK), but the protection was improved by the addition of formic acid (FA85).

EXAMPLE 2

The tests described in Table 2 were run at 350° F. using SM25Cr tubing.

TABLE 2

| SM25Cr Tests at 350° F. for 6 Hours in 15% HCl | | | | |
|---|---|---|---|---|
| Sample | Inhibitor 2% Vol | 1st Additive g $Sb_2O_3$ | 2d Additive | Removal Rate lb/sq. ft. |
| 7 | AFAAF | 0.2 | — | 0.42 |
| 8 | AFAAF | 0.2 | 2% FA85 | 0.058 |
| 9 | QPK | 0.4 | — | 0.20 |
| 10 | QPK | 0.2 | 2% FA85 | 0.032 |

At this temperature, the combination of formic acid (FA85) with antimony was required for effective inhibition.

TABLE 3

| SM25Cr Tests at 300° F. for 6 Hours in 15% HCl All Samples: 1st Additive is 0.48 g $Sb_2O_3$ | | | | |
|---|---|---|---|---|
| Sample | Inhibitor | 2d Additive | 3d Additive | Removal Rate lb/sq. ft. |
| 11 | 0.5 PK | — | — | 0.33 |
| 12 | 0.5 PK | 4% FA85 | — | 0.046 |
| 13 | 0.5 NMQCl | — | — | 0.89 |
| 14 | 0.5 NMQCl | 4% FA85 | — | 0.98 |
| 15 | 0.5 NMBZC | — | — | 0.68 |
| 16 | 0.5 NMBZC | 4% FA85 | — | 0.95 |
| 17 | 0.5 PK | 0.5 g NMQCl | — | 0.045 |
| 18 | 0.5 PK | 0.5 g NMQCl | 4% FA85 | 0.0094 |
| 19 | 0.5 PK | 0.5 g NMBZC | — | 0.030 |
| 20 | 0.5 PK | 0.5 g NMBZC | 4% FA85 | 0.0097 |
| 21 | TCA | — | — | 0.77 |
| 22 | TCA | 4% FA85 | — | 0.61 |
| 23 | TCA | 0.5 g NMQCl | — | 0.075 |
| 24 | TCA | 0.5 g NMQCl | 4% FA85 | 0.014 |

This experiment shows the organic inhibitors that are operative in the presence of antimony or antimony with formic acid: phenyl ketones, phenyl ketone plus a quaternary salt of nitrogen-containing heterocyclic, aromatic compound, and cinnamaldehyde plus a quaternary salt of nitrogen-containing heterocyclic aromatic compound. All of the commercial inhibitors tested also fall into the above named four categories.

EXAMPLE 3

Corrosion tests of VS22 steel, a 22% Cr, 5% Ni duplex steel, were in 15% HCl for 8 hours total time. All tests had organic inhibitor and 0.5g $SbCl_3$.

TABLE 4

Corrosion of VS22 in 15% HCl
All Samples: 1.5% Inhibitor and 0.5 g $SbCl_3$

| Sample | Inhibitor | Temperature °F. | Removal Rate lb/sq. ft. W/O FA85 | W/4% FA85 |
|---|---|---|---|---|
| 25 | AFAAF | 300 | 0.31 | 0.022 |
| 26 | AFAAF | 325 | 0.54 | 0.023 |
| 27 | AFAAF | 350 | — | 0.450 |
| 28 | AFAA | 300 | 0.26 | 0.026 |
| 29 | AFAA | 325 | 0.20 | 0.023 |
| 30 | AFAA | 350 | — | 0.040 |
| 31 | QPK | 300 | 0.03 | 0.013 |
| 32 | QPK | 325 | — | 0.013 |
| 33 | QPK | 350 | — | 0.016 | types of organic inhibitors at 300° F., but the mixture of Sb/formic acid is more effective than the antimony alone, and must be used at the 325°-350° F. range.

EXAMPLE 4

These tests were run with 13% Cr steel at 350° F. in 15% HCl 1.5% of the inhibitor was used in all cases.

TABLE 5

Corrosion of 13% Cr Steel in 15% HCl with 1.5% Inhibitor

| Sample | Inhibitor | Alone | W/4% FA85 | W/$SbCl_3$ 0.2 g | W/FA85 + Sb |
|---|---|---|---|---|---|
| 33 | APQCA | 0.920 | 0.870 | 0.835 | 0.081 |
| 34 | AFAAF | 0.928 | 0.204 | 0.820 | 0.075 |
| 35 | AFAA | 0.740 | 0.295 | 0.767 | 0.084 |
| 36 | QPK | 0.741 | 0.155 | 0.837 | 0.094 |

A synergism is demonstrated for the combination of formic acid and $SbCl_3$ as compared with the individual aids. At a level of 0.2 g of $SbCl_3$, no significant inhibition is found for any of the inhibitors without formic acid.

EXAMPLES 6 and 7

A number of chemicals and mixtures were tested with antimony and bismuth at temperatures between 300° F.-350° F. in 15% HCl (Table 6) and in 12/3 mud acid (12% HCl and 3% HF, Table 7) for eight hours.

TABLE 6

Corrosion of VS22 in 15% HCl with 1.5% Inhibitor

| Sample | Inhibitor | Temp °F. | $SbCl_3$ | $SbCl_3$/FA85 | $SbCl_3$/KI | $Bi_2O_3$ | $Bi_2O_3$/FA85 | $Bi_2O_3$ KI |
|---|---|---|---|---|---|---|---|---|
| 37 | AFAAF | 300 | 0.31 | 0.022 | 0.022 | 0.37 | 0.23 | 0.045 |
| 38 | AFAAF | 325 | 0.54 | 0.02 | 0.025 | 0.68 | 0.19 | 0.05 |
| 39 | AFAAF | 350 | — | 0.45 | 0.04 | — | 0.73 | 0.11 |
| 40 | AFAA | 300 | 0.26 | 0.026 | 0.033 | 0.66 | 0.045 | — |
| 41 | AFAA | 325 | 0.13 | 0.023 | 0.034 | — | — | — |
| 42 | AFAA | 350 | — | 0.04 | 0.05 | — | 0.33 | 0.08 |
| 43 | QPK | 300 | 0.03 | 0.013 | 0.02 | 0.60 | 0.027 | 0.026 |
| 44 | QPK | 325 | — | 0.046 | 0.046 | 0.15 | 0.010 | 0.018 |
| 45 | QPK | 350 | 0.28 | 0.016 | 0.039 | — | 0.46 | 0.12 |

TABLE 7

Corrosion of VS22 in 12/3 Mud Acid with 1.5% Inhibitor

| Sample | Inhibitor | Temp °F. | $SbCl_3$ | $SbCl_3$/FA85 | $SbCl_3$/KI | $Bi_2O_3$ | $Bi_2O_3$/FA85 | $Bi_2O_3$ KI |
|---|---|---|---|---|---|---|---|---|
| 46 | AFAAF | 300 | 0.045 | 0.044 | 0.07 | 0.65 | 0.56 | 0.083 |
| 47 | AFAAF | 325 | 0.13 | 0.033 | 0.07 | 0.7 | 0.17 | 0.15 |
| 48 | AFAAF | 350 | — | 0.053 | — | — | — | — |
| 49 | AFAA | 300 | — | 0.06 | — | — | — | — |
| 50 | AFAA | 325 | 0.062 | 0.043 | 0.11 | — | — | — |
| 51 | AFAA | 350 | — | 0.07* | — | — | — | — |
| 52 | QPK | 300 | 0.047 | 0.047 | 0.050 | — | — | — |
| 53 | QPK | 325 | — | 0.028 | 0.038 | 0.47 | 0.03 | 0.10 |
| 54 | QPK | 350 | — | 0.032 | 0.045 | — | — | — |

*Unacceptable pitting.

These data confirm the findings of Tables 1 to 3. Antimony salts (apparently any salt soluble in HCl) will protect duplex steel in the presence of the specified Table 8 shows a comparative example of an inhibitor based on copper according to U.S. Pat. No. 4,871,024.

TABLE 8

Corrosion of VS22 in HCl or 12/3 Mud Acid
with 1.5% Comparative Cu-based Inhibitor

| | | | 15% HCl | | | 12/3 Mud Acid | |
|---|---|---|---|---|---|---|---|
| Sample | Inhibitor | Temp F.° | $Cu_2Cl_2$ | $Cu_2Cl_2$/FA85 | $Cu_2Cl_2$/KI | $Cu_2Cl_2$ | $Cu_2Cl_2$/FA85 | $Cu_2Cl_2$ KI |
| 55 | AAF | 300 | 0.241 | 0.15 | 0.03 | 0.18 | 0.27 | 0.045 |
| 56 | AFAAF | 325 | 0.60 | 0.60 | 0.06 | 0.41 | 0.88 | — |
| 57 | AFAAF | 350 | — | 0.67 | 0.16 | — | — | — |
| 58 | AFAA | 300 | 0.21 | 0.11 | 0.035 | — | — | — |

TABLE 8-continued

Corrosion of VS22 in HCl or 12/3 Mud Acid
with 1.5% Comparative Cu-based Inhibitor

| | | | 15% HCl | | | 12/3 Mud Acid | | |
|---|---|---|---|---|---|---|---|---|
| Sample | Inhibitor | Temp F.° | $Cu_2Cl_2$ | $Cu_2Cl_2/$ FA85 | $Cu_2Cl_2/$ KI | $Cu_2Cl_2$ | $Cu_2Cl_2/$ FA85 | $Cu_2Cl_2$ KI |
| 59 | AFAA | 325 | — | — | — | — | — | 0.43 |
| 60 | AFAA | 350 | — | 0.71 | 0.09 | — | — | — |
| 61 | QPK | 300 | 0.155 | 0.062 | 0.025 | 0.11 | 0.18 | 0.025 |
| 62 | QPK | 325 | 0.21 | 0.12 | 0.068 | 0.35 | 0.09 | — |
| 63 | QPK | 350 | — | 1.1 | 0.21 | — | — | — |

The antimony, bismuth, and a comparative prior art inhibitor were tested with phenyl ketone plus a quaternary salt of nitrogen-containing heterocyclic, aromatic compound, the reaction product of acetophenone, formaldehyde, and an amine-post formulated with acetylenic alcohol, and nonionic surfactants (AFAA) or that composition additionally formulated with formaldehyde (AFAAF).

As shown in Tables 6-8, at 300° F., many combinations gave acceptably low corrosion rates in 15% HCl. Antimony, bismuth, or the prior art copper when mixed respectively with formic acid or potassium iodide gave acceptable results. At 325° F., the acceptable choices are the same. However, at 350° F., only antimony mixtures or bismuth with KI are acceptable. Regarding Table 7 and that portion of Table 8 pertaining to mud acid, antimony appears to give superior corrosion protection in this agressive acid system. Antimony plus formic acid and a mixture of quinolinium salts, phenyl ketones, and nonionic surfactants gave the lowest corrosion rates at the three temperatures. However, antimony plus potassium iodide also gave acceptable corrosion rates with the mixture of quinolinium sales, phenyl ketones, and nonionic surfactants.

It will be understood that the above description of the present invention is susceptible to various modifications, changes and adaptations, and the same are intended to be comprehended within the meaning and range of equivalents of the appended claims.

What is claimed is:

1. A composition for inhibiting corrosion of steel containing greater than about 9% chromium exposed to elevated temperatures above about 250° F. to about 475° F. and to at lest one mineral acid, comprising:
   an organic inhibitor selected from the group consisting of phenyl ketone, phenyl ketone with a quaternary salt of a nitrogen-containing heterocyclic aromatic compound, and cinnamaldehyde with a quaternary salt of a nitrogen-containing heterocyclic aromatic compound; and
   an acid-soluble compound from the group consisting of antimony and bismuth.

2. A composition as defined in claim 1, further comprising a surfactant.

3. A composition as defined in claim 1, wherein the phenyl ketone is a member of the group consisting of phenones, α-alkenylphenones and α-hydroxyalkenylphenones.

4. A composition as defined in claim 1, wherein, the quaternary salt of a nitrogen-containing heterocyclic aromatic compound is a member of the group consisting of alkyl pyridinium halides, alkylaryl pyridinium halides, alkyl quinolinium halides, alkylaryl quinolinium halides, alkyl isoquinoliniun halides, alkylaryl isoquinolinium halides, alkyl benzoazolinium halides, alkylaryl benzoazolinium halides, alkyl benzothiazolinium halides and alkylaryl benzothiazolinium halides.

5. A composition as defined in claim 1, wherein the acid-soluble compound is antimony, further comprising a member of the group consisting of formic acid and a formic acid derivative.

6. A composition as defined in claim 1, wherein the acid-soluble compound is bismuth further comprising a compound generating a soluble iodide under acidic conditions.

7. A composition for inhibiting corrosion of steel having greater than about 9% chromium exposed to elevated temperatures above about 250° F. to about 475° F. and to a volume (D) of at least one mineral acid, comprising:
   from about 0.1 to 2 wt %, compared to D, of an organic inhibitor selected from the group consisting of phenyl ketone, phenyl ketone with a quaternary salt of a nitrogen-containing heterocyclic aromatic compound, and cinnamaldehyde with a quaternary salt of a nitrogen-containing heterocyclic aromatic compound;
   from about 0.1 to 2 wt %, compared to D, $Bi_2O_3$ and from about 0.1 to 2 wt %, compared to D, soluble iodide.

8. A composition for inhibiting corrosion of steel having greater than about 9% chromium exposed to elevated temperatures above about 250° F. to about 475° F. and to a volume (D) of at least one mineral acid, comprising:
   from 0.1 to approximately 2% wt %, compared to D, or an organic inhibitor selected from the group consisting of phenyl ketone, phenyl ketone with a quaternary salt of a nitrogen-containing heterocyclic aromatic compound, and cinnamaldehyde with a quaternary salt of a nitrogen-containing heterocyclic aromatic compound; and
   from 0.01 to approximately 2 wt %, compared to D, of a acid-soluble antimony compound.

9. A composition as defined in claim 8, further comprising from 0.5 to 10 wt %, compared to D, of a member of the group consisting of formic acid and a formic acid derivative.

10. A composition as defined in claim 9, wherein the formic acid derivative is a member of the group consisting of unsubstituted formamide, substituted formamide, unsubstituted formate and substituted formate.

11. A composition as defined in claim 9, wherein the acid soluble antimony compound is a member of the group consisting of $SbCl_3$ and $Sb_2O_3$.

12. A process for inhibiting corrosion of steel having greater than about 9% chromium, exposed to at least one mineral acid and elevated temperatures above about 250° F. to about 475° F., comprising the steps of:
   providing a composition of an organic inhibitor selected from the group consisting of phenyl ketone, phenyl ketone with a quaternary salt of a nitrogen-containing heterocyclic aromatic compound and cinnamaldehyde with a quaternary salt of a nitrogen-containing heterocyclic aromatic compound; and an acid-soluble metal from the group consisting of an antimony and bismuth; and exposing the steel to an effective amount of the composition.

* * * * *